United States Patent [19]

Shimomura et al.

[11] Patent Number: 4,705,612
[45] Date of Patent: Nov. 10, 1987

[54] METHOD FOR PLASMA-INITIATED POLYMERIZATION

[75] Inventors: Takeshi Shimomura; Tohru Takahashi, both of Fujinomiya, Japan

[73] Assignee: Terumo Kabushiki Kaisha, Tokyo, Japan

[21] Appl. No.: 826,579

[22] Filed: Feb. 6, 1986

[30] Foreign Application Priority Data

Feb. 8, 1985 [JP] Japan .................................. 60-22001
Jun. 28, 1985 [JP] Japan ................................ 60-140574
Oct. 11, 1985 [JP] Japan ................................ 60-224892

[51] Int. Cl.⁴ .............................................. C08F 2/52
[52] U.S. Cl. ..................................... 204/165; 204/168
[58] Field of Search ................................ 204/165, 168

[56] References Cited

U.S. PATENT DOCUMENTS 4,212,719  7/1980  Osada et al. ..................... 204/165

FOREIGN PATENT DOCUMENTS 0095974  12/1983  European Pat. Off. ............ 204/165

Primary Examiner—Arthur P. Demers
Attorney, Agent, or Firm—Burns, Doane, Swecker & Mathis

[57] ABSTRACT

In a method for plasma-initiated polymerization by the steps of exposing a vapor phase containing monomer vapor to a plasma and introducing a polymerization initiating active seed consequently produced into a condensate phase of monomer thereby effecting chain-growth polymerization of the monomer, the improvement which comprises effecting the production of the polymer while keeping a radical polymerization initiator present at least in the aforementioned vapor phase.

21 Claims, 17 Drawing Figures

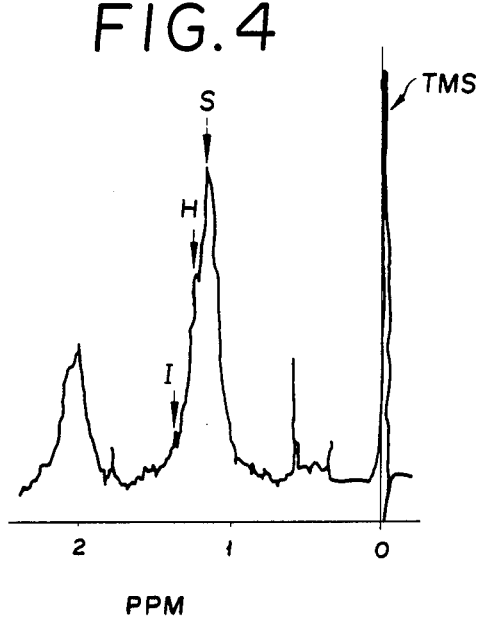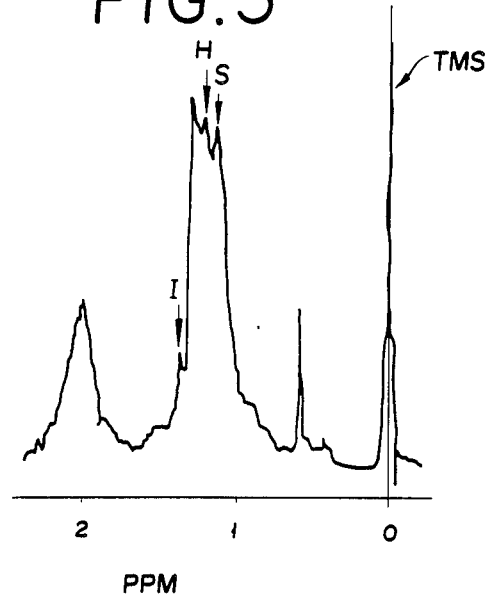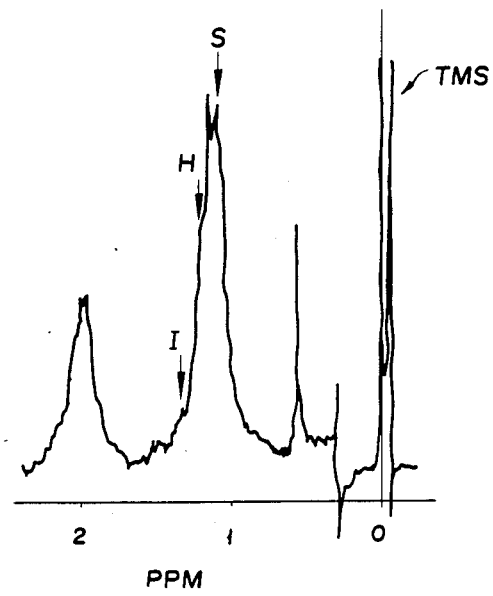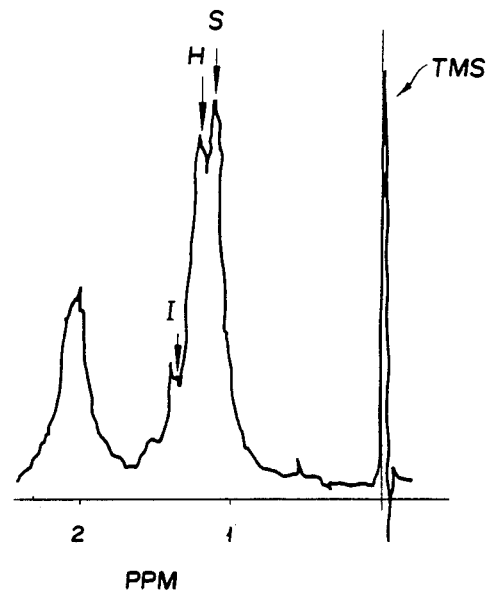

METHOD FOR PLASMA-INITIATED POLYMERIZATION

BACKGROUND OF THE INVENTION

1. Field of the Invention

This invention relates to a method for plasma-initiated polymerization. More particularly, this invention relates to a method for plasma-initiated polymerization which has a relatively short polymerization time, gives a desired product in a high yield, and abounds in practicality. To be more specific, this invention relates to a method for plasma-initiated polymerization which is capable of preparing an ultra-high molecular weight polymer preeminently excelling in such polymer properties as thermal properties and solution properties in a short polymerization time in a high yield.

2. Description of Prior Art

Polymers obtained by low-temperature plasma-initiated polymerization differ widely in nature from polymers obtained by heat-initiated polymerization. In various fields, such polymers by the plasma polymerization have come to attract growing attention in recent years. The plasma polymerization has been chiefly used in vapor-phase polymerization or applied for surface treatment. More recently, the so-called plasma-initiated polymerization which resides in utilizing the active seed produced in a vapor phase under generation of plasma for a condensatephase reaction has been established. The plasma-initiated polymerization comprises exposing a monomer vapor equilibrated with a liquid or solid monomer to a plasma for a short time thereby producing a polymerically active seed and then allowing the polymerically active seed produced in the plasma to come into contact with the surface of the liquid or solid monomer thereby starting polymerization growing in the liquid or solid monomer. Unlike the ordinary plasma polymerization such as the plasma vapor-phase polymerization wherein all the component steps including start of polymerization, growth, migration, recombination, and restart take place in the presence of plasma, the plasma-initiated polymerization in such that only the initiation of polymerization occurs in the vapor phase and the subsequent reactions for growth and stop of polymerization occur in the condensate phase.

After the plasma-initiated polymerization, post-polymerization can occur with living-radical monomer initiator. Therefore, the plasma-initiated polymerization is capable of producing a linear ultra-high molecular polymer without impairing the chemical structure of the starting monomer. This polymerization, therefore, permits ready analysis of its reaction mechanism and promises to permit development of varying functional high molecular compounds such as, for example, extremely high molecular polymers, block copolymers, immobilized enzymes, monocrystalline polymers, and inorganic polymers.

In the plasma-initiated polymerization of a vinyl monomer such as, for example, methyl methacrylate (MMA), when MMA is exposed to the plasma for 60 seconds and then subjected to post polymerization at 25° C., the reaction of polymerization living-radically proceeds with elapse of time and reaches the level of 10,000,000 to 30,000,000 of molecular weight in ten days ([Y. Osada, A. T. Bell, and M. Shen: J. Polym. Sci., Polym. Lett. Ed. 16 (1978), 309], [D. Johnson, Y. Osada, A. T. Bell, and M. Shen: Macromolecules 14 (1981), 118], and [Y. Kashiwagi, Y. Einaga, and H. Fujita, Polym. J. 12 (1980), 271]. The polymethyl methacrylate (PMMA) obtained by the conventional thermal polymerization excels in transparency and nevertheless suffers from the disadvantage that thermal properties are poor, mechanical properties such as strength at rupture are low, solution properties are inferior, and elongation of polymer relative to solution concentration (thread-forming property) is small. In contrast, the polymethyl methacrylate (PMMA) obtained by the plasma-initiated polymerization described above has a molecular weight of the order of $10^7$, about 10 to 100 times as large as the molecular weight of the polymethyl methacrylate obtained by the conventional thermal polymerization. The plasma-initiated polymerized PMMA excels not only in mechanical properties at elevated temperatures but also in abrasion resistance and scratch hardness. Further, since it contains no additive except the initiator, it enjoys outstanding safety and has a bright prospect of finding utility in applications to medical high polymers.

As regards the microscopic structure, the plasma-initiated polymerization PMMA, on analysis by high resolution NMR, shows a triad distribution of iso, hetero, and syndio components. We have studied the plasma-initiated polymerized PMMA in comparison with the thermally polymerized PMMA and consequently found that it has a fairly high syndio component even with due allowance for the fraction ascribable to the factor of temperature and that it induces a polymerization reaction yielding a product of high crystal phase structure.

The method of plasma-initiated polymerization is capable of producing an excellent and characteristic polymer as described above. As noted from the literatures cited above, however, this method produces a polymer in a low yield and necessitates a very long time for polymerization (in the case of MMA as a monomer, for example, the yield is about 40 to 50% and the polymerization time is about 100 hours). Thus, the method of plasma-initiated polymerization proves to be quite disadvantageous from the viewpoint of practicality.

An object of this invention, therefore, is to provide an improved method of plasma-initiated polymerization.

A further object of this invention is to provide a highly practical method of plasma-initiated polymerization which has a relatively short polymerization time and produces polymer in a high yield.

Another object of this invention is to provide a method of plasma-initiated polymerization which is capable of shortening the polymerization time and increasing the yield of product of polymerization.

Yet another object of this invention is to provide a method of plasma-initiated polymerization which is capable of preparing an extremely high molecular weight polymer excellent in such polymer properties as thermal properties and solution properties with a short polymerization time in a high yield.

SUMMARY OF THE INVENTION

In a method of plasma-initiated polymerization which comprises exposing a vapor phase containing a monomer vapor to a plasma thereby producing a polymerization initiating active seed and introducing the active seed into a monomer condensate phase thereby effecting chain-growth polymerization of the monomer, the objects described above are accomplished by a method of plasma-initiated polymerization which is characterized by producing the polymer by causing a radical polymerization initiator to be present at least in the vapor phase.

This invention also discloses a method of plasma-initiated polymerization, wherein the radical polymerization initiator is contained in both the monomer vapor phase and the monomer condensate phase. This invention also discloses a method of plasma-initiated polymerization, wherein a methacrylate type or acrylate type vinyl monomer is used as a monomer for polymerization. This invention further discloses a method of plasma-initiated polymerization, wherein the radical polymerization initiator is selected from the group of peroxides and azo compounds. This invention discloses a method of plasma-initiated polymerization, wherein the monomer condensate phase during the exposure to the plasma is in a state equilibrated with the monomer vapor phase. This invention also discloses a method of plasma-initiated polymerization, wherein the monomer condensate phase during the exposure to the plasma is separated from the monomer vapor phase. This invention further discloses a method of plasma-initiated polymerization, wherein the monomer vapor present during the exposure to the plasma is released from the system after completion of the exposure and subsequently the chain-growth polymerization is continued on a fresh monomer sealed in the vessel used for the exposure to the plasma. Further, this invention discloses a method of plasma-initiated polymerization, wherein the polymerization initiating active seed is formed in the theoretical amount so that the chain-growth polymerization of the monomer may be stopped at a desired degree of polymerization.

In a method of plasma-initiated polymerization which comprises exposing a vapor phase containing a monomer vapor to a plasma thereby producing a polymerization initiating active seed and introducing the active seed into a monomer condensate phase thereby effecting chain-growth polymerization of the monomer, the objects described above are also accomplished by a method of plasma-initiated polymerization which is characterized by producing the polymer by causing a radical polymerization initiator to be present at least in the aforementioned vapor phase and effecting the chain-growth polymerization of monomer in the presence of an alcohol.

This invention discloses a method of plasma-initiated polymerization, wherein the alcohol is a lower alcohol. This invention also discloses a method of plasma-initiated polymerization, wherein the lower alcohol is selected from the group consisting of methanol, ethanol, n-propanol, isopropanol, n-butanol, sec-butanol, tert-butanol, and mixtures thereof. This invention further discloses a method of plasma-initiated polymerization, wherein the lower alcohol is methanol.

In a method of plasma-initiated polymerization which comprises exposing a vapor phase containing a monomer vapor to a plasma thereby producing a polymerization initiating active seed and introducing the active seed into a monomer condensate phase thereby effecting chain-growth polymerization of the monomer, the objects described above are accomplished by a method of plasma-initiated polymerization which is characterized by producing the polymer by causing a radical polymerization initiator to be present at least in the vapor phase and effecting the chain-growth polymerization at a low temperature in the range of 20° to −20° C.

This invention discloses a method of plasma-initiated polymerization, wherein the low-temperature active radical polymerization initiator has a half life of 10 hours at a temperature of not more than 60° C. This invention further discloses a method of plasma-initiated polymerization, wherein the low-temperature active radical polymerization initiator is diisopropyl peroxyneodecanoate.

The salient characteristic of the method of plasma-initiated polymerization contemplated by the present invention resides in using a radical polymerization initiator in the course of the polymerization. Surprisingly, it has been found that when the plasma-initiated polymerization is carried out by using the radical polymerization initiator, the post-polymerization which subsequently occurs in the monomer condensate phase proceeds fairly rapidly and actively and produces a polymer with a short polymerization time in a high yield as compared with the ordinary plasma-initiated polymerization which is effected without use of any polymerization initiator. Moreover, the polymer obtained by the method of plasma-initiated polymerization of this invention is an extremely high molecular weight polymer possessing properties equalling the properties of the polymer obtained by the conventional method of plasma-initiated polymerization. When the monomer is MMA, for example, the produced PMMA has a molecular weight of the order of $10^7$ and, in terms of microscopic structure, shows entirely the same triad distribution as the PMMA obtained by the conventional method of plasma-initiated polymerization and nevertheless acquires a high syndio component content.

It has been further found that the extremely high molecular weight PMMA obtained by the method of plasma-initiated polymerization of the present invention exhibits excellent thermal properties and solution properties [thread-forming property and non-Newtonian viscosity (structural viscosity)] and permits correction of the various drawbacks of the conventional PMMA, i.e. susceptibility to ready thermal embrittlement and inability to manifest polymer properties amply unless the polymer solution reaches a concentration of not less than 10%.

BRIEF DESCRIPTION OF THE DRAWINGS

FIGS. 4–7 are NMR specturm charts of PMMA's;

EXPLANATION OF PREFERRED EMBODIMENT

Figure 1A:
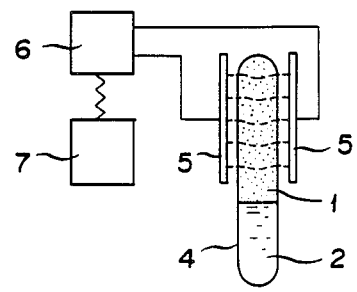
FIGS. 1A–1B, FIGS. 2A–2B, and FIGS. 3A–3D are diagrams illustrating embodiments of the method of plasma-initiated polymerization of this invention.

The method of plasma-initiated polymerization of the present invention, similarly to the ordinary method of plasma-initiated polymerization, comprises exposing a vapor phase containing a monomer vapor to the plasma and introducing the produced polymerization initiating active seed into a monomer condensate phase thereby effecting chain-growth polymerization of the monomer.

In this case, at least the monomer vapor phase contains therein a radical polymerization initiator during the exposure of the vapor phase to the plasma.

For the plasma-initiated polymerization by the method of this invention, any monomer which can be polymerized, particularly radically, by the conventional method of plasma-initiated polymerization can be adopted. Typical examples of the important monomer for the purpose of this plasma-initiated polymerization are vinyl monomers, particularly methacrylate type and acrylate type vinyl monomers, and methacrylic acid (MAA), methyl methacrylate (MMA), ethyl methacrylate (EMA), n-butyl methacrylate, acrylic acid, methacrylamide (MAAM), acrylamide (AAM), 2-hydroxyethyl methacrylate (HEMA), and 2-acrylamide-2-methyl propane solfonic acid (AMPPS).

As the radical polymerization initiator to be used in the method of plasma-initiated polymerization of the present invention, any of the substances which are usable for the conventional radical polymerization can be adopted. Examples of the radical polymerization initiator where the monomer is an acryl type or methacryl type vinyl monomer are low-temperature active radical polymerization initiators including peroxides such as acetylcyclohexylsulfonyl peroxide, isobutylyl peroxide, cumylperoxy neodecanoate, diisopropylperoxy dicarbonate, di-n-propylperoxy dicarbonate, dicyclohexylperoxy dicarbonate, dimyristylperoxy dicarbonate, di-(2-ethoxyethyl)peroxy dicarbonate, di-(methoxyisopropyl)peroxy dicarbonate, di-(2-ethylhexylperoxy)dicarbonate, di-(3-methyl-3-methoxybutyl)peroxy dicarbonate, t-butylperoxy neodecanoate, potassium persulfate, and ammonium persulfate and azo compounds such as 2,2'-azo-bis(4-methoxy-2,4-dimethylvaleronitrile), and 2,2'-azo-bis(2,4-dimethylvaleronitrile), and high-temperature active radical polymerization initiators including proxides such as t-butylcumyl peroxide, diisopropylbenzene hydroperoxide, di-t-butyl peroxide, p-menthane hydroperoxide, 2,5-dimethyl-2,5-di-(t-butylperoxy)hexyne-3 1,1,3,3-tetramethylbutyl hydroperoxide, 2,5-dimethylhexane-2,5-dihydroperoxide, cumene hydroperoxide, t-butyl hydroperoxide, 1,1-bis(t-butylperoxy)-3,3,5-trimethyl cyclohexane, 1,1-bis(t-butylperoxy)cyclohexane, t-butyl peroxymaleate, t-butyl peroxylaurate, t-butyl peroxy-3,5,5-trimethylhexanonate, t-butylperoxy-2-ethylhexanoate, cyclohexanone peroxide, t-butylperoxy isopropyl carbonate, 2,5-dimethyl-2,5-di-(benzoylperoxy)hexane, 2,2-bis(t-butylperoxy)octane, t-butylperoxy acetate, 2,2-bis-(t-butylperoxy)butane, t-butylperoxy benzoate, n-butyl-4,4-bis(t-butylperoxy) valerate, di-t-butyl diperoxy isophthalate, methylethyl ketone peroxide, α, α'-bis(t-butylperoxyisopropyl)benzene, dicumyl peroxide, 2,5-dimetyl-2,5-di(t-butylperoxy)hexane, t-butyl hydroperoxide, m-toluoyl peroxide, benzoyl peroxide, t-butyl peroxy isobutyrate, octanoyl peroxide, decanoyl peroxide, lauroyl peroxide, stearoyl peroxide, propionyl peroxide, and succinic acid peroxide and azo compounds such as 1,1'-azo-bis(cyclohexane-1-carbonitirile) and azobisisobutyronitirile. The low-temperature active radical polymerization initiators enumerated above are those whose decomposition points for affording a half life of 10 hours are invariably not more than 60° C. and the high-temperature active radical polymerization initiators enumerated above are those whose decomposition points for affording a half life of 10 hours are roughly in the range of 60° to 220° C.

The amount of the radical polymerization initiator to the monomer cannot be generally defined because it is heavily affected by the polymerization degree of the polymer desired to be obtained and the kind of the monomer and that of the radical polymerization initiator to be used. Excessive addition of the radical polymerization initiator proves undesirable because the added radical polymerization initiator is not wholly used up during the course of polymerization but part thereof is suffered to persist in the produced polymer. As the radical polymerization initiator for the production of PMMA of a molecular weight of the order of $10^7$, benzoyl peroxide, (BPO) is used in an amount of $4 \times 10^{-5}$ to $2 \times 10^{-2}$ mole/liter, azo-bis-isobutyronitrile (AIBN) in an amount of $6 \times 10^{-5}$ to $6 \times 10^{-3}$ mole/liter, or diisopropyl-peroxy dicarbonate in an amount of $10^{-5}$ to $10^{-4}$ mole/liter, for example.

The plasma to be used in the present invention is desired to be a nonequilibrium plasma, particularly a low-temperature plasma produced by glow discharge. The low-temperature plasma is obtained by applying a voltage in the range of 20 to 100 W, preferably 30 to 50 W, to a gaseous substance held under a vacuum such as, for example, a pressure in the range of 0.1 to 10 mmHg. The electrodes for the purpose of this glow discharge are external or internal parallel planar electrodes or coiled electrodes, preferably external parallel planar electrodes. The gaseous substance as the source of plasma may be any gas such as hydrogen, methane, nitrogen, argon, or ethylene or a monomer gas itself.

Figure 1B:
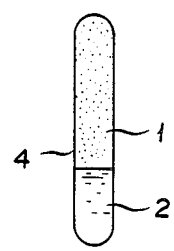
Figure 2A:
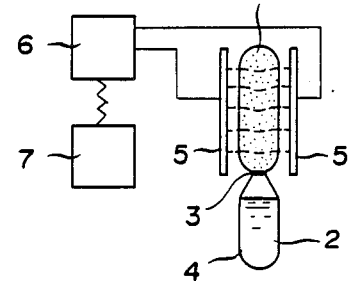
Figure 2B:
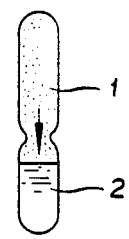
Figures 3A, 3B, 3C, 3D:
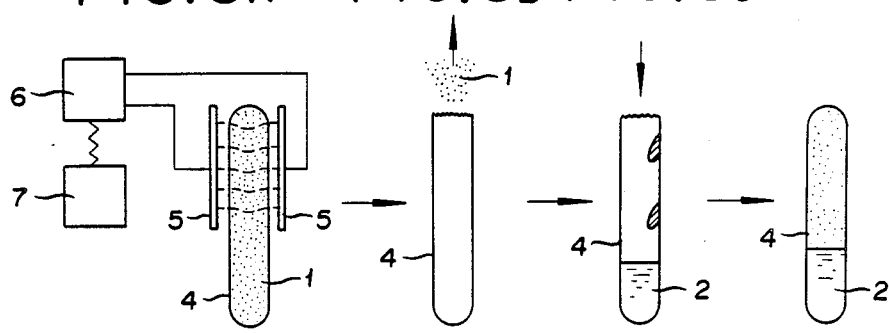

Generally in the method of plasma-initiated polymerization, a condensate phase 2 of monomer and a vapor phase 1 of monomer are not separated from each other as by the use of a partition but are held in a state of equilibrium within one container 3 during the course of the exposure to the plasma as illustrated in FIGS. 1A–2B. The exposure of the vapor phase 1 to the plasma produces a polymerization initiating active seed and the contact of this active seed with the surface of the condensate phase induces the post polymerization. As widely known, the plasma-initiated polymerization may be otherwise effected by keeping the condensate phase 2 of monomer and the vapor phase 1 of monomer separated from each other as by a partition 3, for example, as illustrated in FIGS. 2A–2B during the course of the exposure to the plasma and exposing the vapor phase 1 to the plasma, then removing the partition 3 thereby introducing the vapor phase 1 now containing a polymerization initiating active seed into the condensate phase 2, and initiating the post-polymerization owing to the contact of the polymerization initiating active seed with the condensate phase 2 or by keeping only the vapor phase 1 containing monomer vapor sealed within a plasma reaction vessel 4 as illustrated in FIGS. 3A–3B during the course of the exposure to the plasma and exposing the vapor phase 1 to the plasma, removing the vapor phase 1 from the reaction vessel 4 and from the reaction system, then sealing fresh monomer in the reaction vessel 4 already used for the exposure to the plasma, and effecting the post-polymerization in the condensate phase 2. These procedures are feasible because an extremely thin coating of high molecular compound is deposited on the surface of the plasma reaction vessel 4 made of such material as glass and the polymerization initiating active seed is sequestered by the matric structure of the high molecular compound even during the course of the plasma-initiated polymerization and further because the vapor phase 1 also contains a finely divided plasma polymer having the same active seed sequestered therein (Masayuki Kuzutani: "Mechanism of Plasma-Initiated Polymerization," Glossary of Lectures for Plasma Chemistry Symposiums, Nov. 14, 1984).

The material for the plasma reaction vessel 4 which is to be used in the plasma-initiated polymerization effected by the procedure of FIGS. 1A–2B or the procedure of FIGS. 3A–3C is required to be such that the surface of the reaction vessel 4 will permit fast adhesion of the aforementioned extremely thin coating of polymer. Examples of the material satisfying the requirement are quartz glass and Pyrex glass. Pyrex glass is preferred over quartz glass.

In FIG. 1A, FIG. 2A, and FIG. 3A, the symbol 5 stands for an electrode, the symbol 6 for a RF oscillator, and the symbol 7 for a control unit.

The exposure of the vapor phase 1 to the plasma is carried out at a temperature at which the monomer vapor can exist in the vapor phase 1 under a vacuum. Generally, this temperature is somewhere around normal room temperature. The exposure time is not specifically defined. A short exposure time suffices for the production of the polymerization initiating active seed. To be more specific, a period of several seconds to several minutes will be generally sufficient. The post-polymerization in the condensate phase 1 is carried out around room temperature (generally no exceeding 25° C., preferably falling in the range of 25° to °C.), though this temperature is variable with the kind of the radical polymerization initiator to be used, for example. If the post-polymerization is carried out at an excessively high temperature, there is the possibility that the reaction will proceed in the manner of thermal polymerization and give rise to a polymer of low polymerization degree. If the post-polymerization is carried out at an excessively low temperature, there is the possibility that the polymerization will not proceed as smoothly as required. When the radical polymerization initiator to be used is of a low-temperature active type, however, the post-polymerization in the condensate phase satisfactorily proceeds even in a low temperature range such as, for example, 0° to −20° C., in which the post-polymerization of the conventional plasma-initiated polymerization proceeds only with fair difficulty.

The post-polymerization in which the chain-growth polymerization proceeds brings about a particularly advantageous effect when it is carried out at a low temperature in the range of 20° to −20° C. It has been found that the temperature condition of the post-polymerization largely affects the yield of the polymer to be formed and the value of average molecular weight of the polymer and that the post-polymerization, when the radical polymerization initiator used therein is of a low-temperature active type, proceeds fairly rapidly and actively to produce the polymer with a short polymerization time in a high yield at a low temperature in the range of 20° to −20° C. in which the conventional plasma-initiated polymerization does not proceed at all. Further, the polymer which is obtained under these conditions can be an extremely high molecular weight polymer possessed of properties equalling the properties of the polymer obtained by the conventional plasma-initiated polymerization. In this case, the radical polymerization initiator is required to be of a low-temperature active type.

The post-polymerization brings about a more advantageous effect when an alcohol is present in the condensate phase during the course of the polymerization. Surprisingly, it has been found that when the alcohol is present in the condensate phase of monomer produces the polymer with a shorter polymerization time in a higher yield than when the radical polymerization initiator is used as a sole additive and that the product of this post-polymerization is an extremely high molecular weight polymer possessing properties equalling the properties of the polymer obtained by the plasma-initiated polymerization of the the present invention. Where MMA is used as the monomer, for example, the produced PMMA has a molecular weight of the order of $10^7$ and, in terms of microscopic structure, shows entirely the same triad distribution as the PMMA obtained by the conventional plasma-initiated polymerization using no radical polymerization initiator and possesses a high syndio component content. These facts far surpass all expectations arising from the generally accepted theory that in the solution polymerization or precipitation polymerization, the reaction of polymerization proceeds rather slowly and the produced polymer tends to have a low molecular weight. Further, it has been found that in the polymerization system under discussion, since the PMMA is not soluble in the alcohol, the alcohol contained in the polymer is gradually separated from the system in proportion as the amount of the PMMA is increased.

Typical examples of the alcohol to be incorporated in the reaction system are alcohols having roughly one to ten carbon atoms such as methanol, ethanol, n-propanol, isopropanol, n-butanol, sec-butanol, tert-butanol, n-amyl alcohol, iso-amyl alcohol, hexanol, heptanol, octanol, capryl alcohol, nonyl alcohol, and decyl alcohol. Among other alcohols cited above, lower alcohols prove desirable. Methanol is the most desirable selection. The amount of the alcohol to be added to the monomer is variable with the kind of monomer to be used. When MMA is adopted as a monomer, for example, the monomer:alcohol ratio (by volume) is desired to fall roughly in the range of 3:7 to 7:3, preferably roughly in the range of 4:6 to 6:4, more preferably close to about 1:1. This alcohol may be present in or absent from the vapor phase during the course of the exposure to the plasma.

In the method of plasma-initiated polymerization of the present invention, control of the polymerization degree of the polymer to be obtained can be effected by causing the polymerization initiating active seed which is produced by the exposure to the plasma to be generated in the theoretical value.

The method of plasma-initiated polymerization of the present invention, has been described solely with respect to the general procedure. The method of plasma-initiated ploymerization of the present invention can be easily embodied by making a slight alteration (i.e. the presence of a radical polymerization initiator), in the conventional method of plasma-initiated polymerization as applied to the known manufacture of a block copolymer or to the immobilization of an enzyme.

Now, the present invention will be described more specifically below with reference to working examples.

EXAMPLES 1–4

A polymerization tube of Pyrex glass having an inside diameter of 15 mm (inner volume of 42 ml) was charged with 15 ml of MMA monomer and a varying amount of benzoyl peroxide (BPO) indicated in Table 1, connected to a vacuum line, and frozen with liquid nitrogen. This system was deaerated to a vacuum below $10^{-3}$ Torr for thorough expulsion of oxygen and the charge therein was fused. This procedure was repeated three times and then the opening of the polymerization tube was sealed. The monomer in the sealed polymerization tube was thoroughly cooled and frozen with liquid nitrogen. At the time that part of the monomer inside the ploymerization tube began to melt near room temperature, generation of plasma was effected in the vapor phase under pressure of $10^{-1}$ Torr as illustrated in FIGS. 1A–1B. For the plasma generation were used parallel planar electrodes of copper $15.0 \times 10.0$ cm$^2$ in area separated by a gap of 18 mm. To the electrodes was applied an output of 40 W by a ratio wave (RF) transmission unit of 13.56 MHz provided with a control unit. The exposure time of plasma was 60 seconds.

After completion of the exposure to the plasma, the polymerization tube was left standing at room temperature (25° C.) for a varying time indicated in Table 1 to effect post-polymerization. The yields and average molecular weights of the produced PMMA's are shown in Table 1.

EXAMPLES 5-8

PMMA's were produced by following the procedure of Example 1-4, except that azo-bis-isobutyronitrile (AIBN) was used in a varying amount indicated in Table 1 in place of BPO as a radical polymerization initiator. The yields and average molecular weights of the produced PMMA's are shown in Table 1.

Control 1

A PMMA was produced by following the procedure of Examples 1-4, except that no radical polymerization initiator was used. The yield and average molecular weight of the produced PMMA are shown in Table 1.

Control 2

A PMMA was produced by charging a similar polymerization tube with 15 ml of MMA monomer and an amount of azo-bis-isobutyronitrile (AIBN) indicated in Table 1 and heating the polymerization tube at 70° C. for 5 hours. The yield and average molecular weight of the produced PMMA are shown in Table 1.

TABLE 1

| | Radical polymerization initiator | | Polymerization time | Yield (%) | Average molecular weight ($\times 10^7$) |
|---|---|---|---|---|---|
| | Kind | Concentration (mole/liter) | | | |
| Example 1 | BPO | $4.13 \times 10^{-5}$ | 5 days | 4.6 | 1.215 |
| Example 2 | BPO | $4.13 \times 10^{-4}$ | " | 5.8 | 1.165 |
| Example 3 | BPO | $4.13 \times 10^{-3}$ | " | 80.7 | 1.872 |
| Example 4 | BPO | $2.06 \times 10^{-2}$ | " | 80.0 | 1.692 |
| Example 5 | AIBN | $6.09 \times 10^{-5}$ | " | 5.4 | 1.165 |
| Example 6 | AIBN | $6.09 \times 10^{-4}$ | " | 71.3 | 1.102 |
| Example 7 | AIBN | $6.09 \times 10^{-3}$ | " | 81.7 | 1.692 |
| Example 8 | AIBN | $3.04 \times 10^{-2}$ | 3 days | 87.6 | 0.475 |
| Control 1 | — | — | 5 days | 5.7 | 1.816 |
| Control 2 | AIBN | $3.04 \times 10^{-2}$ | 5 hrs | 89.9 | 0.139 |

From the results, it is noted that the PMMA's obtained by the method of plasma-initiated polymerization of the present invention acquired average molecular weights of the order of $10^7$ after 5 days' post-polymerization and that these order of average molecular weights were one decimal higher than the average molecular weight of the PMMA obtained by the conventional thermal polymerization (Control 2) and were as same as the PMMA obtained by the conventional plasma-initiated polymerization (Control 1). No correlation was found between the amount of radical polymerization initiator and the magnitude of average molecular weight. While the PMMA was produced in a yield of not more than 10% by weight by the conventional plasma-initiated polymerization (Control 1), the PMMA's were produced in notably high yields of about 80% by weight by the method of plasma-initiated polymerization of this invention with the concentration of BPO in the range of $4 \times 10^{-5}$ to $2 \times 10^{-2}$ mole/liter and the concentration of AIBN in the range of $6 \times 10^{-4}$ to $3 \times 10^{-2}$ mole/liter.

Determination of Tacticity (I)

The PMMA's obtained in Example 3, Example 8, Control 1, and Control 2 were analyzed with a 100-MHz NMR measuring instrument made by Japan Electron Optics Laboratory Co., Ltd. to test for stereospecificity. The results are shown in Table 2 and FIGS. 4–7. FIG. 4, FIG. 5, FIG. 6, and FIG. 7 show NMR spectrum charts respectively of the PMMA's of Example 3, Example 8, Control 1, and Control 2. The PMMA samples were dissolved in chlorobenzene and subjected to the NMR analysis at 23° C.

TABLE 2

| PMMA | Isotactic (%) | Heterotactic (%) | Syndiotactic (%) |
|---|---|---|---|
| Example 3 | 9.9 | 36.6 | 53.4 |
| Example 8 | 14.7 | 41.2 | 44.1 |
| Control 1 | 10.7 | 35.8 | 53.5 |
| Control 2 | 13.2 | 41.3 | 45.5 |

From the results, it is noted that all the PMMA's showed varying triad distributions and that the PMMA obtained by the plasma-initiated polymerization using BPO as a radical polymerization initiator (Example 3) showed a syndiotactic content equal to the syndiotactic content of the PMMA obtained by the conventional plasma-initiated polymerization (Control 1) and about 10% higher than that of the PMMA obtained by the thermal polymerization (Control 2). The results indicate that the method of plasma-initiated polymerization of the present invention is capable of producing an PMMA similar in structure to the PMMA obtained by the conventional plasma-initiated polymerization.

Determination of Dynamic Properties

The PMMA obtained in Example 8 and a commercially available PMMA of an average molecular weight of 125,000 (produced by Kyowa Gas Chemical Industry Co., Ltd. and marketed under designation of "GC-1000") were tested for dynamic properties with a testing machine (produced by Toyo Precision Machinery and marketed under trademark designation of "Strograph, Model T"). A given PMMA sample was dissolved in benzene and the solution was cast on a Teflon plate to produce a film. The film was vacuum dried at 60° C. for 4 hours. A strip cut from the dried film was fastened to a chuck and stretched at 80° C. at a rate of 100 mm/min until fracture, to determine the strength at fracture. The results are shown in Table 3 and FIGS.

Figure 8:
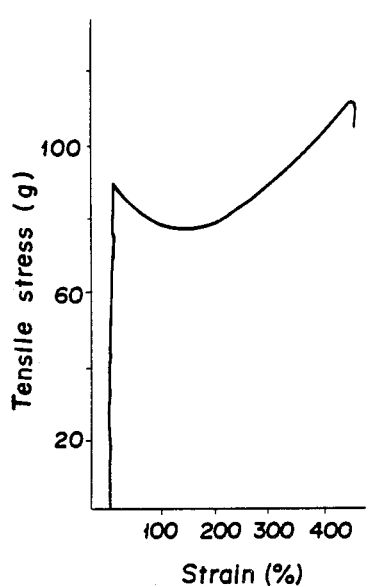
FIGS. 8–9 are diagrams showing stress-strain curves of PMMA's.
Figure 9:
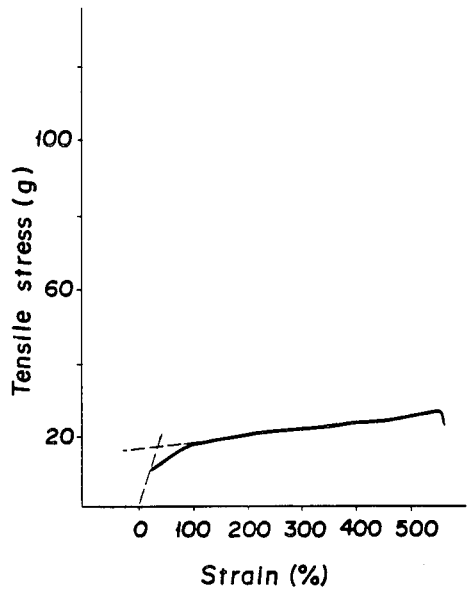

8-9. FIG. 8 and FIG. 9 show stress-strain curves respectively of the PMMA of Example 8 and the commercially available PMMA.

TABLE 3

| PMMA | Average molecular Weight ($\times 10^6$) | Strength at fracture (dyne/cm$^2$) |
|---|---|---|
| Example 8 | 4.750 | $2.22 \times 10^5$ |
| Commercially available product | 0.125 | $7.49 \times 10^4$ |

From the results, it is noted that the PMMA obtained by the method of plasma-initiated polymerization of this invention (Example 8) had about three times as high strength at fracture as the strength of the commercially available PMMA and that the method of plasma-initiated polymerization of the present invention is capable of producing an ultra-high molecular weight polymer similarly to the conventional method of plasma-initiated polymerization. It is clear from comparison of FIG. 8 and FIG. 9 that the stress-strain curve of the PMMA obtained by the method of this invention fell beyond the yield point, rose again, and then reached the point of fracture, whereas that of the commercially available PMMA smoothly rose from the point beyond the yield point to the point of fracture. This fact indicates that the PMMA obtained by the method of this invention underwent no free fusion but retained polymer elasticity around 80° C. owing to its excellent thermal properties.

Characteristics on Length of Formed Thread

The PMMA's obtained in Example 3 and Control 2 and the commercially available PMMA (produced by Kyowa Gas Chemical Industry Co., Ltd. and marketed under trademark desingation of "Parapet GC-1000") were tested for length of thread formed. For the test, a given polymer was precipitated in methanol, refined by solution in benzene, and dissolved again in benzene.

Figure 10:
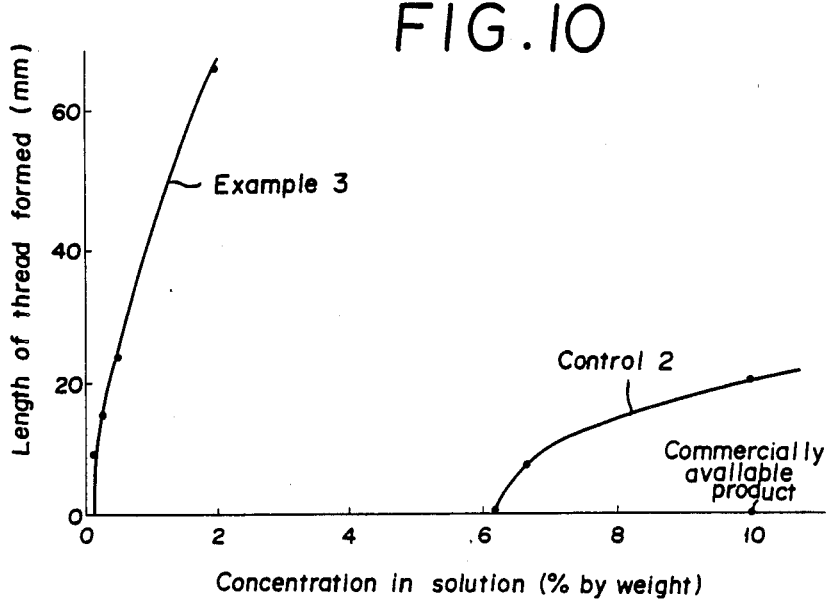
FIG. 10 is a diagram showing the relation between polymer solution concentration and length of formed thread of PMMA.

The determination of the length of thread formed was effected by vertically dipping a glass bar 4 mm in diameter into a given PMMA/benzene solution sample to a depth of 1 cm and then lifting the glass bar at a fixed rate of 10 mm/sec. The length of the thread of the solution drawn between the leading end of the glass bar and the surface of the solution sample at the time the thread was fractured was measured and reported as the length of thread formed. The determination was carried out at room temperature (22° C.), with the PMMA concentration in the solution sample varied as indicated. The results are shown in Table 4 and FIG. 10.

TABLE 4

| Polymer | Polymer concentration (in benzene) (% by weight) | Length of thread formed (mm) | $[\eta]_{benzene}^{20°C.}$ | MW |
|---|---|---|---|---|
| Example 3 | 2.0 | 66 | | |
| | 0.5 | 22 | | |
| | 0.3 | 15 | | |
| | 0.25 | 15 | $1.75 \times 10^3$ | $1.872 \times 10$ |
| | 0.17 | 12 | | |
| | 0.10 | 9 | | |
| | 0.07 | 0 | | |
| Control 2 | 10.0 | 20 | | |
| | 6.7 | 8 | $2.43 \times 10^2$ | $1.394 \times 10^6$ |
| | 6.1 | 0 | | |
| | 5.0 | 0 | | |
| Commercially available product | 10.0 | 0 | $3.89 \times 10$ | $1.250 \times 10^5$ |

From the results, it is noted that the PMMA obtained by the method of this invention showed a higher thread-forming property of 66 mm even at a solution concentration of 2% by weight and exhibited notable thread-forming property at lower polymer concentrations than the commercially available PMMA obtained by the thermal polymerization. Further, in the molecular weight of PMMA calculated from the intrinsic viscosity, $\eta$, in accordance with the Mark-Howink formula (I):

$$\eta = KM^\alpha \qquad (I)$$

(wherein $\eta$ was measured in benzene solution at 30° C. and $K = 5.2 \times 10^{-3}$ and $\alpha = 0.76$), it was confirmed that the thread-forming property of the polymer increased even in the low-concentration solution in proportion as the molecular weight of the polymer increased.

Determination of Molecular Weight by Light-scattering Method

A PMMA separated obtained by the method of plasma-initiated polymerization of this invention was tested for molecular weight by the light-scattering method of Zimm Plot Method, in comparison with a commercially available PMMA (produced by Kyowa Gas Chemical Industry Co., Ltd. and marketed under trademark desigation of "Parapet GC-1000") and polystyrene (standard grade) produced by Toyo Soda Co., Ltd. The light scattering of a given PMMA sample was measured in a methylethyl ketone solution (25°±1° C.) and that of a polystyrene sample in a benzene solution (30°±1° C.). The results are shown in Table 5, in comparison with the values calculated by the viscosity method.

TABLE 5

| | Viscosity method | | Light-scattering method | | Second virial coefficient, $A_2$ |
|---|---|---|---|---|---|
| | $[\eta]$ (dl/g)* | MW | MW | Radius of inertia $<S^2>^{\frac{1}{2}}$ | |
| PMMA of this invention | 23.1 | $2.70 \times 10^7$ | $2.66 \times 10^7$ | $3.11 \times 10^3$ | $6.44 \times 10^{-5}$ |
| Commercially available | 0.39 | $1.25 \times 10^5$ | $9.76 \times 10^4$ | $1.79 \times 10^2$ | $3.90 \times 10^{-4}$ |

TABLE 5-continued

| | Viscosity method | | Light-scattering method | | Second virial coefficient, $A_2$ |
|---|---|---|---|---|---|
| | $[\eta]$ (dl/g)* | MW | MW | Radius of inertia $\langle S^2 \rangle^{\frac{1}{2}}$ | |
| PMMA Commercially available polystyrene | 3.40 | $1.78 \times 10^7$ | $1.83 \times 10^7$ | $3.00 \times 10^3$ | $2.14 \times 10^{-4}$ |

*PMMA $[\eta]_{benzene}^{30°C} = 5.20 \times 10^{-3} M^{0.76}$

Polystrene $[\eta]_{trans-decaline}^{20.4°C} = 8.05 \times 10^{-4} M^{0.50}$

From the results, it is noted that the PMMA of the present invention was an extremely high molecular weight polymer. The values of weight-average molecular weight of PMMA determined by the viscosity method were good agreement with those of weight-average molecular weight determined by the light-scattering method.

Solution Properties

Figure 11:
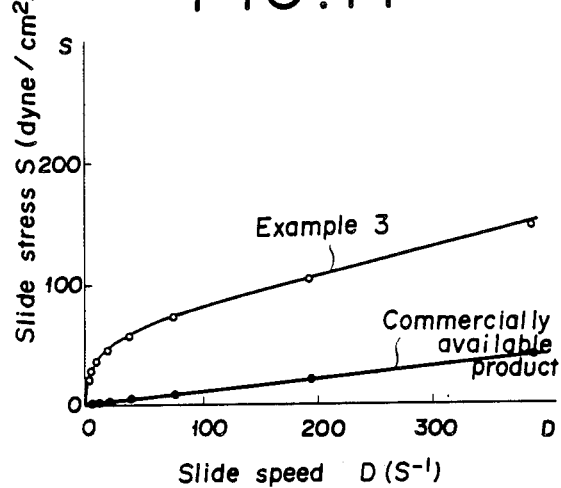
FIG. 11 is a diagram showing the S-D curve of PMMA.

The PMMA obtained in Example 3 and a commercially available PMMA (produced by kyowa Gas Chemical Industry Co., Ltd. and marketed under trademark designation of "Parapet ® GC-1000") were independently dissolved in benzene to prepare PMMA/benzene solution samples of two concentration levels, 1.0 and 10.0% by volume. These solution samples were tested for shear rate-shear stress relation with a rotary viscosimeter, Model E (product of Toki Industry). The results are shown in Table 6 and FIG. 11.

TABLE 6

| Shear rate, $D$ (S$^{-1}$) | Value of shear stress, S (dyne/cm$^2$) at 20° C. | |
|---|---|---|
| | Example 3 | Commercially available PMMA |
| 0.5 | 20.40 | 0.50 |
| 1.0 | 26.30 | 0.99 |
| 2.5 | 35.70 | 1.49 |
| 5.0 | 44.70 | 2.98 |
| 10.0 | 56.60 | 4.97 |
| 20.0 | 72.00 | 9.43 |
| 50.0 | 105.30 | 23.30 |
| 100.0 | 152.40 | 46.70 |

Figure 12:
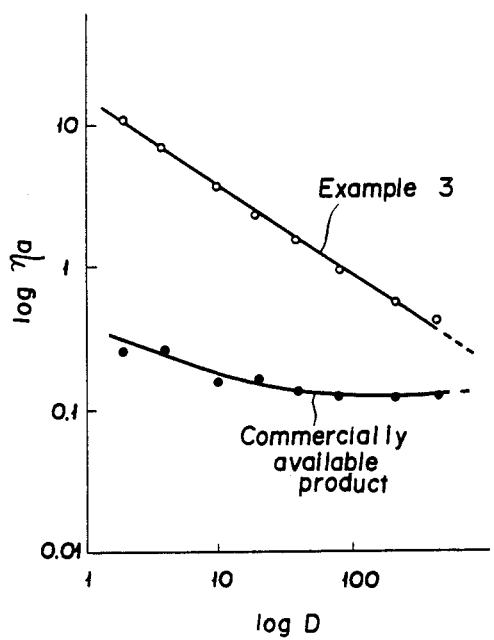
FIG. 12 is a diagram showing log $\eta_a$-lon D of PMMA.

From the results, it is noted that the S-D fluidity curve of the PMMA of the present invention described a depressed line past the origin parallelly to the axis D. This curve, therefore, corresponds to the generally accepted pseudoplastic curve, $S = \mu D^n$, $1 > n > 0$, of the non-Newtonian fluid (wherein $\mu$ stands for the coefficient of non-Newtonian viscosity and n for the index of non-Newtonian viscosity). Generally, the fact that the index n of such a fluid as satisfying the exponential rule is small indicates that the condensate structure of the fluid is weak. Thus, the fluidity curve under question indicates that the PMMA of this invention exhibits a structural viscosity. To confirm this point, the data of log $\eta_a$ vs. log D were plotted (wherein $\eta_a = S/D$). The point asserted above is supported by the fact that in the log $\eta_a$ (wherein $\eta_a = S/D$) vs. log D curves shown in FIG. 12, the curve of the PMMA of the present invention has linearity sloped down to the right.

Melting Point

The PMMA obtained in Example 3 and a commercially available PMMA (produced by Kyowa Gas Chemical Industry Co., Ltd. and marketed under trademark designation of "Parapet GC-1000") were tested for melting point with a micro-melting point tester (product of Mitamura Riken). Consequently, the PMMA of Example 3 obtained by the method of plasma-initiated polymerization of the present invention was found to have a melting point of 280° to 290° C. and the commerically available PMMA a melting point in the neighborhood of 180° C., indicating that the melting point of the PMMA of this invention was about 100° C. higher than that of the commercially available PMMA.

EXAMPLES 9-10

A polymerization tube (15 mm in inside diameter and 42 ml in inner volume) made of Pyrex glass was charged with 15 ml of MMA monomer and an amount of BPO indicated in Table 7. The charge in the polymerization tube was frozen with liquefied nitrogen, deaerated three times, exposed to plasma 30 seconds at 50 W under $10^{-1}$ Torr for initiating polymerization, and left standing for post-polymerization at a varying temperature for a varying time indicated in Table 7. The yields and average molecular weights of the produced PMMA are shown in Table 7.

Control 3

A PMMA was produced by following the procedure of Example 10, except that the addition of BPO was omitted. The yield and average molecular weight of the produced PMMA are shown in Table 7.

TABLE 7

| | BPO concentration (mole/liter) | MMA concentration (mole/liter) | Temperature of post-polymeriaztion (°C.) | Yield (% by weight) | Average molecular weight ($10^{-7}$) |
|---|---|---|---|---|---|
| Example 9 | $4.13 \times 10^{-3}$ | $1.40 \times 10^{-1}$ | 20 | 14.8 | 0.15 |
| Example 10 | $4.13 \times 10^{-3}$ | $1.40 \times 10^{-1}$ | 25 | 80.7 | 1.872 |
| Control 3 | — | $1.40 \times 10^{-1}$ | 25 | 5.7 | 1.816 |

From the results, it is noted that when benzoyl peroxide (BPO) (half time, t$\frac{1}{2}$, 10 hrs/74° C. and 100 hrs/57° C.) was used as a radical polymerization initiator, the temperature of the post-polymerization heavily affected the yield of PMMA.

EXAMPLES 11-12

PMMA's were produced by following the procedure of Examples 9-10, except that diisopropylperoxy dicarbonate (half life 6, 82 hrs/40° C. and 25, 5 hrs/35° C.) was used as a radical polymerization initiator, the temperature of post-polymerization was fixed as indicated in Table 8, and the time of post-polymerization was fixed at 14 days. The yields and average molecular weights of the produced PMMA's are shown in Table 8.

Control 4

Plasma-initiated polymerization was carried out by following the procedure of Example 11, except that the addition of diisopropylperoxy dicarbonate was omitted. The results are shown in Table 8.

EXAMPLES 13-14

A Pyrex glass tube having an inside diameter of 15 mm (inner volume of 42 ml) was charged with 15 ml of MMA monomer and an amount of diisopropylperoxy dicarbonate (half life, $t_{\frac{1}{2}}$, 6, 82 hrs/40° C. and 25, 5 hrs/35° C.) indicated in Table 10, connected to a vacuum line, and frozen with liquefied nitrogen. This system was deaerated to a vacuum below $10^{-3}$ Torr for

TABLE 8

|  | Diisopropylperoxy dicarbonate concentration (mole/liter) | MMA concentration (mole/liter) | Temperature of post-polymerization (°C.) | Yield (% by weight) | Average molecular weight ($10^{-7}$) |
|---|---|---|---|---|---|
| Example 11 | $4.85 \times 10^{-3}$ | $1.40 \times 10^{-1}$ | 0.0 | 79.3 | 1.986 |
| Example 12 | $4.85 \times 10^{-3}$ | $1.40 \times 10^{-1}$ | −20.0 | 13.2 | 0.5650 |
| Control 4 | — | $1.40 \times 10^{-1}$ | 0.0 | 0.0 | — |

From the results, it is noted that when a low-temperature active diisopropylperoxy dicarbonate was used as a radical polymerization initiator, the yield and average molecular weight of the produced PMMA were both lower than those of the PMMA produced by the post-polymerization effected at 0° C. and that the polymerization proceeded sufficiently even at −20° C. In contrast, no polymerization was observed to occur when the use of a radical polymerization initiator was omitted. It is concluded from these results that the plasma-initiated polymerization was liable to be promoted when the post-polymerization was effected at a temperature suitable for decomposition of the radical polymerization initiator to be used.

Determination of Tacticity (II)

The PMMA's obtained in Examples 11-12 were analyzed by the same 100-MHz NMR measuring instrument made by Japan Electron Optics Laboratory Co., Ltd. to test for stereoregularity. The results are shown in Table 9. For the purpose of reference, Table 9 additionally shows the results of analysis of the PMMA's obtained in Control 1 and Control 2.

TABLE 9

| PMMA | Isotactic (%) | Heterotactic (%) | Syndiotactic (%) |
|---|---|---|---|
| Example 11 | 13.4 | 42.7 | 43.9 |
| Example 12 | 11.0 | 44.3 | 44.7 |
| Control 1 | 10.7 | 35.8 | 53.5 |
| Control 2 | 13.2 | 41.3 | 45.5 |

From the results, it is noted that the numerical values of stereoregularity of the PMMA's produced at post-polymerization temperatures of 0° C. and −20° C. were not different from those of the PMMA's produced at post-polymerization temperatures of 20° to 25° C. given in (I) above.

thorough expulsion of oxygen and the charge therein was fused. This procedure was repeated three times and then the opening of the polymerization tube was sealed by fusion. The monomer in the sealed polymerization tube was thoroughly cooled and frozen with liquefied nitrogen. At the time that part of the monomer inside the polymerization tube began to melt near room temperature, generation of plasma was effected in the vapor phase as illustrated in FIGS. 1A-1B. For the plasma generation were used parallel planar electrodes of copper $15.0 \times 10.0$ cm$^2$ in area separated by a gap of 18 mm. To the electrodes was applied an output of 50 W by a radio wave (RF) transmission unit of 13.56 MHz provided with a control unit. The exposure time of plasma was 30 seconds.

After completion of the exposure to the plasma, the polymerization tube was left standing at a varying temperature for a varying period indicated in Table 1 to effect post-polymerization. The yields and average molecular weights of the produced PMMA's are shown in Table 10.

Controls 5-6

Polymerizations under conditions indicated in Table 10 were carried out by following the procedure of Examples 13-14, except that the addition of diisopropylperoxy dicarbonate was omitted. The yields and average molecular weights of the produced PMMA's are shown in Table 10.

TABLE 10

|  | Kind | Concentration (mole/liter) | Polymerization time | Temperature of post-polymerization (°C.) | Yield (% by weight) | Average molecular weight ($\times 10^7$) |
|---|---|---|---|---|---|---|
| Example 13 | Diisopropylperoxy dicarbonate | $4.85 \times 10^{-3}$ | 14 days | 0 | 79.3 | 1.986 |
| Example 14 | Diisopropylperoxy dicarbonate | $4.85 \times 10^{-3}$ | 14 days | −20 | 13.2 | 0.5650 |
| Control 5 | — | — | 14 days | 0 | 0 | — |
| Control 6 | — | — | 5 days | 25 | 5.7 | 1.816 |

From the results, it is noted that even in a low temperature range in which absolutely no polymer was produced when the use of a radical polymerization initiator was omitted, the chain-growth polymerization sufficiently proceeded in the plasma-initiated polymerization by the method of this invention using a low-temperature active radical polymerization initiator. It is further noted that when the post-polymerization was carried out at a temperature suitable for decomposition of the low-temperature active radical polymerization initiator (in the neighborhood of 0° C. in the case of diisopropylperoxy dicarbonate), the PMMA, an extremely high molecular weight polymer having an average molecular weight of the order of $10^7$, was produced in a higher yields.

Determination of Tacticity

The PMMA's obtained in Examples 13–14 and Control 6 were analyzed with the same 100-MHz NMR measuring instrument made by Japan Electron Optics Laboratory Co., Ltd. to test for stereoregularity. The results are shown in Table 11.

TABLE 11

|  | Isotactic (%) | Heterotactic (%) | Sundiotactic (%) |
|---|---|---|---|
| Example 13 | 13.4 | 42.7 | 43.9 |
| Example 14 | 11.0 | 44.3 | 44.7 |
| Control 6 | 10.7 | 35.8 | 53.5 |

From the results, it is noted that the PMMA's produced by the method of this invention were equal in stereoregularity to the PMMA produced by the thermal polymerization.

EXAMPLE 15

A polymerization tube of Pyrex glass having an inside diameter of 15 mm (inner volume of 42 ml) was charged with 0.5 ml ($4.67 \times 10^{-3}$ mol/10 ml) of MMA monomer, 0.5 ml (0.012 mol/10 ml) of methanol, and $1 \times 10^{-2}$ g ($4.13 \times 10^{-5}$ mol) of BPO. Then the polymerization tube was connected to a vacuum line and frozen with liquefied nitrogen. This procedure was repeated three times. The monomer in the polymerization tube was thoroughly cooled and frozen with liquefied nitrogen. At the time that part of the monomer inside the polymerization tube began to melt near room temperature, generation of plasma was in the vapor phase as illustrated in FIGS. 1A–1B. For the plasma generation were used parallel planar electrodes of copper $15.0 \times 10.0$ cm$^2$ in area separated by a gap of 18 mm. To the electrodes was applied an output of 50 W by a radio wave (RF) transmission unit of 13.56 MHz provided with a control unit. The exposure time of plasma was 60 seconds and the degree of vacuum was $10^{-1}$ Torr.

After completion of the exposure to the plasma, a separate polymerization tube of Pyrex glass having an inner diameter of 15 mm (inner volume of 42 ml) was charged with 4.5 ml each of MMA and methanol. The charge in the polymerization tube was vacuum distilled and pored into the former polymerization tube. The polymerization tube was kept cooled with liquefied nitrogen and the opening of the polymerization tube was sealed by fusion. Thereafter, the sealed polymerization tube was kept shaken at room temperature (25° C.±1° C.) for 5 days to effect post-polymerization and produce a PMMA.

In the polymerization under discussion, since the PMMA was not soluble in methanol, the methanol contained in the polymer began to depart from the system on or about the third day of polymerization, namely when the amount of PMMA formed showed a conspicuous increase. After a total of 5 days' post-polymerization, the methanol separated from the polymer was analyzed for its MMA monomer content by gas chromatography (a gas chromatography, Model 163, made by Hitachi, Ltd. using a column 2 m×3 mm in diameter, packed with solid particles 80 to 100 mesh). The MMA monomer content was found to be about 0.5% by volume.

The polymer consequently obtained was dissolved in benzene and refined by precipitation in methanol. Thus, the polymer was obtained in a yield of about 97% by weight.

The viscosity-average molecular weight of the produced PMMA calculated from the limiting viscosity, $\eta$, in accordance with the Mark-Howink formula:

$$\eta = KM^\alpha \quad (I)$$

(wherein $\eta$ was measured in benzene solution at 30° C. and $K=5.2 \times 10^{-3}$ and $\alpha=0.76$) was $1.678 \times 10^7$.

EXAMPLE 16

A polymerization tube of Pyrex glass having an inside diameter of 15 mm (inner volume of 42 ml) was charged with 0.5 ml ($4.67 \times 10^{-3}$ mol/15 ml) of MMA monomer, 0.5 ml ($8.57 \times 10^{-3}$ mol/15 ml) of ethanol, and $15 \times 10^{-2}$ g ($6.19 \times 10^{-5}$ mol) of BPO. The charge of the polymerization tube was exposed to plasma by following the procedure of Example 15 (50 W×60 sec. under $10^{-1}$ Torr.) Then, a separate polymerization tube of Pyrex glass having an inside diameter of 15 mm (inner volume of 42 ml) was charged with 7.0 ml each of MMA and ethanol, with the opening sealed by fusion. The charged in this polymerization tube was vacuum distilled and poured into the former polymerization tube. Then, the post-polymerization was carried out by following the procedure of Example 15, to produce a PMMA. The yield of this PMMA was 91.0% by weight and the viscosity-average molecular weight thereof was $8.967 \times 10^6$.

EXAMPLE 17

A polymerization tube of Pyrex glass having an inside diameter of 15 mm (inner volume of 42 ml) was charged with 0.5 ml ($4.67 \times 10^{-3}$ mol/15 ml) of MMA monomer, 0.5 ml ($6.54 \times 10^{-3}$ mol/15 ml) of isopropanol, and $15 \times 10^{-2}$ g ($6.19 \times 10^{-5}$ mol) of BPO. The charge of the polymerization tube was exposed to plasma by following the procedure of Example 15 (50 W×60 sec. under $10^{-1}$ Torr). Then, a separate polymerization tube of Pyrex glass having an inside diameter of 15 mm (inner volume of 42 ml) was charged with 7.0 ml each of MMA and isopropanol, with the opening sealed by fusion. The charge in the polymerization tube was vacuum distilled and poured into the former polymerization tube. The post-polymerization was carried out by following the procedure of Example 15, to produce a PMMA. The yield of the produced PMMA was 91.5% by weight and the viscosity-average molecular weight thereof was $4.280 \times 10^6$.

EXAMPLE 18

A polymerization tube of Pyrex glass having an inside diameter of 15 mm (inner volume of 42 ml) was charged with 4.5 ml ($4.21 \times 10^{-2}$ mol/15 ml) of MMA monomer, 10.5 ml ($2.59 \times 10^{-1}$ mol/15 ml) of methanol, and $1.5 \times 10^{-2}$ g ($6.19 \times 10^{-5}$ mol). The polymerization tube was connected to a vacuum line, frozen with liquefied nitrogen, and deaerated three times under a vacuum of $10^{-3}$ Torr, with the opening of the polymerization tube sealed by fusion. Initiation of plasma was effected (50 W×60 sec. under $10^{-1}$ Torr) by following the procedure of Example 15. After completion of the exposure to plasma, the polymerization tube was kept cooled with liquefied nitrogen and the opening of the polymerization tube was sealed by fusion. Then, the polymerization tube was shaken at room temperature (25°±1° C.) for 5 days to effect post-polymerization and produce a PMMA.

In the polymerization under discussion, since the PMMA was not soluble in methanol, the methanol contained in the polymer began to depart from the system on or about the third day of polymerization, i.e. when the amount of the PMMA showed a conspicuous increase. After a total of five days post-polymerization, the methanol separated from the polymer was analyzed for its MMA monomer content by gas chromatography (a gas chromatograph, Model 163, made by Hitachi, Ltd. using a column 2 m×3 mm in diameter, packed with solid particles 80 to 100 mesh). The MMA monomer content was found to be about 0.5% by volume.

The polymer consequently obtained was dissolved in benzene and purified by precipitation in methanol. The yield of the produced polymer was about 98.8% by weight.

The viscosity-average molecular weight of the produced PMMA calculated from the limiting viscosity, $\eta$, in accordance with the Mark-Howink formula:

$$\eta = KM^{\alpha} \qquad (I)$$

(wherein $\eta$ was measured in benzene solution at 30° C. and $K=5.2\times10^{-3}$ and $\alpha=0.76$) was $1.115\times10^7$.

EXAMPLE 19

A polymerization tube of Pyrex glass having an inside diameter of 15 mm (inner volume of 42 ml) was charged with 0.5 ml ($4.67\times10^{-3}$ mol/15 ml) of MMA monomer, $15\times10^{-2}$ g ($6.19\times10^{-5}$ mol) of BPO. The charge of the polymerization was subjected to exposure of plasma (50 W×60 sec. under $10^{-1}$ Torr) by following the procedure of Example 15. Then, a separate polymerization tube of Pyrex glass having an inside diameter of 15 mm (inner volume of 42 ml) was charged with 7.0 ml of MMA and 7.5 ml of methanol. The charge of this polymerization tube was vacuum distilled and pored into the former polymerization tube. Thereafter, the post-polymerization was carried out by following the procedure of Example 15 to produce a PMMA. The yield of the produced PMMA was 92.3% by weight and the viscosity-average molecular weight thereof was $1.515\times10^7$.

As described above, in the method of plasma-initiated polymerization by the steps of exposing a vapor phase containing monomer vapor to a plasma and introducing a polymerization initiating active seed consequently produced into a condensate phase of monomer thereby effecting chain-growth polymerization of the monomer, the present invention provides the improvement which comprises effecting the production of a polymer while keeping a radical polymerization initiator present at least in the vapor phase. The method of the present invention therefore, improves the yield of the produced polymer, shortens the polymerization time, and enjoys outstanding practicality at no sacrifice of the characteristic features of the conventional method of plasma-initiated polymerization. The polymer produced by the method of this invention possesses extremely high polymerism and excels in thermal properties and mechanical strengths similarly to the polymer obtained by the conventional method of plasma-initiated polymerization. Further, the method of this invention can be worked in the same apparatus and by the same procedure as the conventional method of plasma-initiated polymerization with the sole exception of the use of a radical polymerization initiator in the monomer. It finds no use for any special means. In accordance with the method of this invention, the polymer is produced in an extremely high yield possibly reaching even 100%. Thus, by allowing the polymerization to be carried out in a container of a desired shape, the polymer may be produced directly as a shaped article. The method of this invention has a bright prospect of being adopted for the fabrication of extremely high methacrylate type or acrylate type polymer being earnestly sought in various fields, particularly the field of medicine. The method is excepted to bright about an improved effect when a peroxide or an azo compound is used as a radical polymerization initiator in the polymerization system.

What is claimed is:

1. A method for plasma-initiated polymerization by the steps of exposing a vapor phase containing monomer vapor to a plasma and introducing a polymerization initiating active seed consequently produced into a condensate phase of monomer thereby effecting chain-growth polymerization of said monomer, which method is characterized by effecting the production of a polymer while keeping a radical polymerization initiator present at least in said vapor phase.

2. A method according to claim 1, wherein said radical polymerization initiator is present in both said vapor phase of monomer and said condensate phase of monomer.

3. A method according to claim 1, wherein said monomer is a methacrylate type or acrylate type vinyl monomer.

4. A method according to claim 1, wherein said radical polymerization initiator is selected from the group consisting of peroxides and azo compounds.

5. A method according to claim 1, wherein said monomer vapor existing during the course of said exposure to said plasma is released from the system after completion of said exposure to plasma and thereafter fresh monomer is sealed in the vessel used said exposure to plasma and allowed to undergo chain-growth polymerization therein.

6. A method according to claim 1, wherein said polymerization initiating active seed has been produced in a theoretical amount so that said chain-growth reaction of monomer will be stopped at a desired polymerization degree of the polymer.

7. A method according to claim 1, wherein said radical polymerization initiator is active at low temperatures and said chain-growth polymerization is effected at low temperatures in the range of 20° to −20° C.

8. A method according to claim 7, wherein said low-temperature active radical polymerization initiator has a half life of 10 hours at a temperature of not more than 60° C.

9. A method according to claim 7, wherein said monomer is a methacrylate type or acrylate type vinyl monomer.

10. A method according to claim 7, wherein said low-temperature active radical polymerization initiator is selected from the group consisting to peroxides and azo compounds.

11. A method according to claim 10, wherein said low-temperature active radical polymerization initiator is diisopropylperoxy neodecanoate.

12. A method according to claim 1, wherein said chain-growth polymerization of monomer is carried out in the present of an alcohol.

13. A method according to claim 12, wherein said monomer is a methacrylate type or acrylate type vinyl monomer.

14. A method according to claim 12, wherein said alcohol is a lower alcohol.

15. A method according to claim 14, wherein said lower alcohol is selected from the group consisting of methanol, ethanol, n-propanol, isopropanol, n-butanol, sec-butanol, tert-butanol, and mixtures thereof.

16. A method according to claim 12, wherein said radical polymerization initiator is selected from the group consisting of peroxides and azo compounds.

17. A method according to claim 12, wherein said condensate phase of monomer is separated from said vapor phase of monomer during the course of said exposure to said plasma.

18. A method for producing a polymer by plasma-initiated polymerization wherein the polymer is of a molecular weight of at least about $10^7$, comprising the steps of exposing a vapor phase containing monomer vapor to a plasma and introducing a polymerization initiating active seed consequently produced into a condensate phase of monomer thereby effecting chain-growth polymerization of said monomer, which method is characterized by effecting the production of polymer while keeping a radical polymerization initiator present at least in said vapor phase, wherein said initiator is benzoyl peroxide or azo-bis-isobutyronitrile.

19. The method according to claim 18, wherein said radical polymerization initiator is benzoyl peroxide in the concentration of $4 \times 10^{-5}$ to $2 \times 10^{-2}$ mole/liter.

20. The method according to claim 18, wherein said radical polymerization initiator is azo-bis-isobutylonitrile in the concentration of $6 \times 10^{-4}$ to $3 \times 10^{-2}$ mole/liter.

21. The method according to claim 18, wherein the molecular weight of the polymer is about $1 \times 10^7$ to about $1.9 \times 10^7$.

* * * * *